United States Patent [19]
DeLong et al.

[11] Patent Number: 5,316,427
[45] Date of Patent: May 31, 1994

[54] ROUND BALE UNROLLER AND METHOD

[76] Inventors: Leonard D. DeLong, Rte. 1 Box 204, Duke, Mo. 65461; Freddy A. Gray, Jr., Rte. 2 Box 66, Waynesville, Mo. 65583

[21] Appl. No.: 63,249

[22] Filed: May 18, 1993

Related U.S. Application Data

[63] Continuation-in-part of Ser. No. 862,962, Apr. 3, 1992, abandoned.

[51] Int. Cl.$^5$ .............................................. A01D 90/10
[52] U.S. Cl. ..................................... 414/24.6; 414/911
[58] Field of Search ............... 414/24.5, 24.6, 607–608, 414/663, 664, 723, 910–911, 920; 242/85, 85 R, 86.52, 68.3, 68.4; 294/61, 67.1, 98, 107–109, 120

[56] References Cited

U.S. PATENT DOCUMENTS

| | | | |
|---|---|---|---|
| 3,861,616 | 1/1975 | Dubberke | 414/24.6 |
| 4,008,862 | 2/1977 | Wilmes . | |
| 4,090,616 | 5/1978 | Runyan et al. . | |
| 4,288,191 | 9/1981 | Lynch . | |
| 4,341,411 | 7/1982 | Edwards . | |
| 4,364,701 | 12/1982 | Lynch et al. . | |
| 4,514,127 | 4/1985 | Maier . | |
| 4,573,846 | 3/1986 | Willbanks et al. | 414/911 |
| 4,648,769 | 3/1987 | Stirling . | |
| 4,878,542 | 11/1989 | Brouwer et al. | 414/911 |
| 5,074,734 | 12/1991 | Price et al. | 414/24.6 |

FOREIGN PATENT DOCUMENTS

| | | | |
|---|---|---|---|
| 1157433 | 11/1983 | Canada | 414/24.6 |
| 2556234 | 6/1977 | Fed. Rep. of Germany | 414/24.6 |
| 2599933 | 12/1987 | France | 414/911 |

*Primary Examiner*—Michael S. Huppert
*Assistant Examiner*—R. B. Johnson
*Attorney, Agent, or Firm*—Robbins & Robbins

[57] ABSTRACT

A device and method are provided for unrolling spirally wound bales of hay which are moved by hydraulic or electric operated bale spikes mounted on a vehicle such as a truck or tractor. The device is comprised of a tubular axle sleeve which fits over the bale impaling spike and is impaled along with the impaling spike into the hay bale when the bale is to be transported by the vehicle. After the bale is moved, the impaling spike is withdrawn leaving the axle sleeve impaled in the center of the bale. Bearings are employed at opposed ends of the axle which are free to rotate on the axle and are connected to lines on opposite sides of the rear of the vehicle. Movement of the truck causes the lines to rotate the axis of the bale from an axial position in alignment with the axis of the truck 90° in order that the bale can be unwound in the manner of a spool to leave a mat-like web of hay upon the ground for feeding livestock.

12 Claims, 3 Drawing Sheets

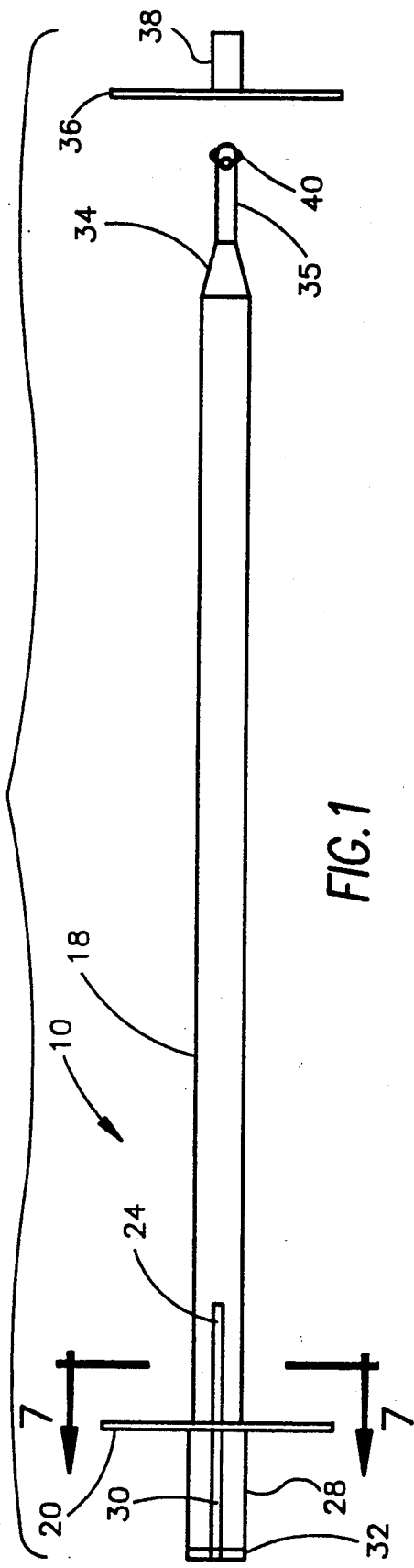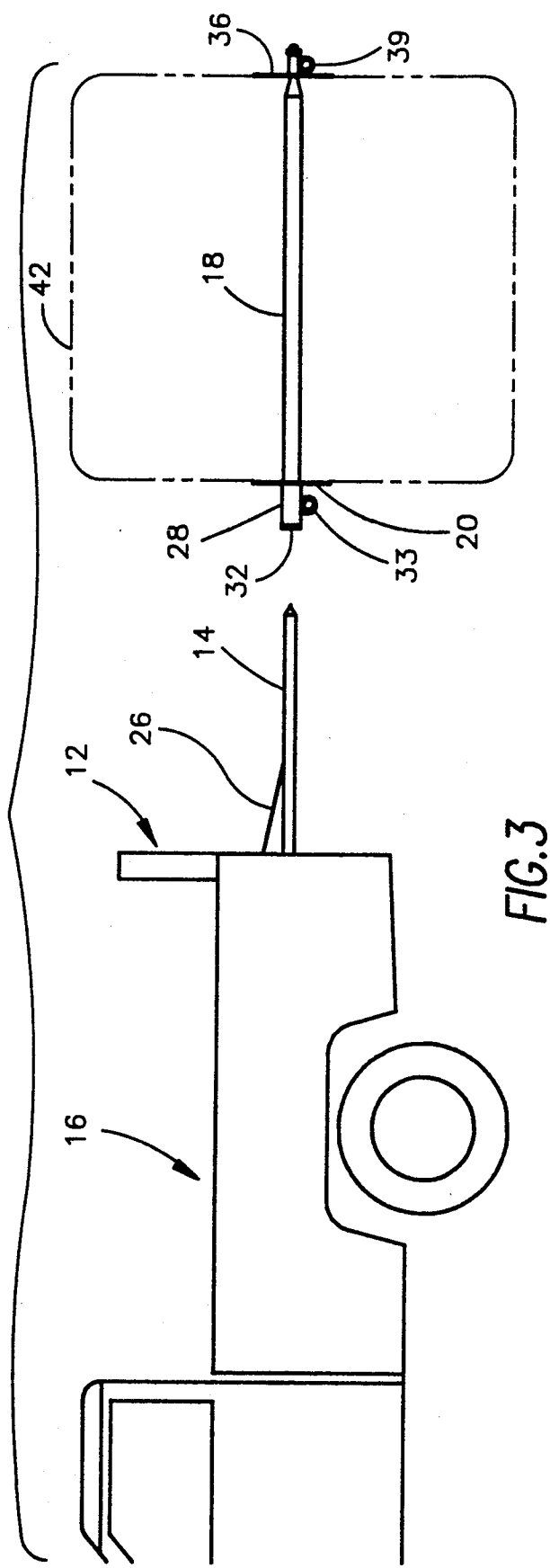

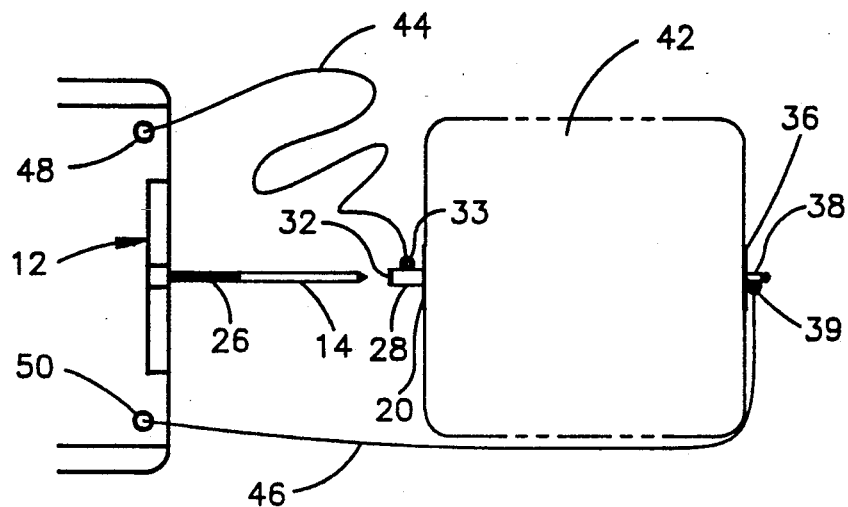
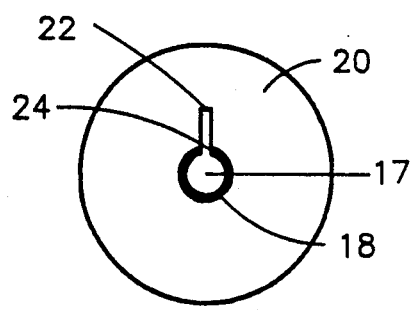
FIG.5
FIG.7
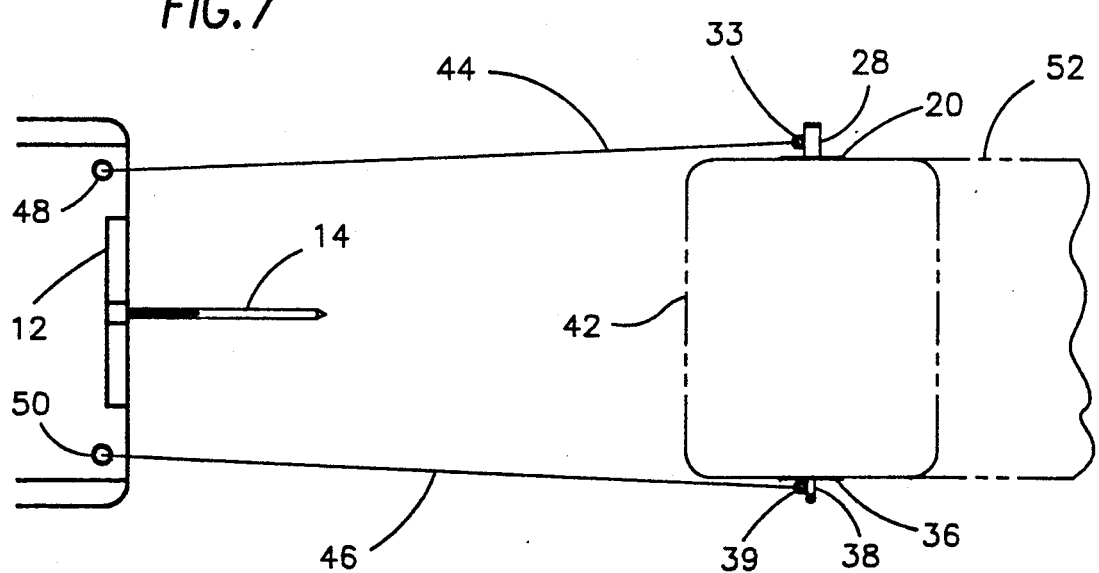
FIG.6

ROUND BALE UNROLLER AND METHOD

RELATED APPLICATIONS

This application is a continuation-in-part of application Ser. No. 07/862,962, filed Apr. 3, 1992, now abandoned.

BACKGROUND OF THE INVENTION

In the field of livestock feeding large round bales of hay are commonly employed. In order to prevent uncontrolled feeding and scattering of hay, round bale feeders may be used to contain the bales. These are essentially a cage or pen with the bale being positioned interiorly to permit the livestock to reach through the feeder without trampling the hay. While such practice has been generally satisfactory, the concentration of livestock around the perimeter of the feeder has caused rutting of the ground and damage to the area in which the livestock are fed including erosion.

Various devices have been employed for unrolling the bale in a web-like mat which may be spread out in a long ribbon-like manner on the field to spread out the area in which the livestock are fed to reduce trampling of the field.

Such devices have generally been in the nature of mechanisms which provide for rotating the bale spike 90° in order that the bale can be unrolled after it has been transported. Such mechanisms are of relatively complex construction and substantial expense which are out or reach for many ranchers and farmers.

Another approach has been to drive an axle through the axis of the bale and attach lines to opposite ends of the axle and the rear of a farm vehicle to unroll the bale. Such a device entails extra labor in driving the axle through the bale after the transport spike has been withdrawn which is laborious and time consuming.

It has remained a problem to provide a simple and easily employed device for unrolling large hay bales which can be readily employed on the ranch or farm.

SUMMARY OF THE INVENTION

By means of this invention there has been provided a hay bale unrolling device which can be simply and readily employed with conventional bale impaling spikes employed with hydraulic lifts on farm vehicles such as trucks or tractors.

The bale unrolling device employs a tubular axle sleeve which is slidably received on the bale spike in such a manner that when the bale spike is impaled in the center of the bale, the sleeve is impaled with it. The bale may be then transported from one area to another in the usual manner. After transport, the vehicle may be moved to withdraw the spike leaving the axle sleeve impaled in the center of the bale.

The axle sleeve has a disc-like collar at a front end which acts as a stop when the spike and axle sleeve are impaled in the bale. Before the spike is withdrawn, a second disc-like collar is placed on a free end of the axle sleeve which protrudes through the bale. Separate lines in the form of ropes, cables or chains are attached to the opposite ends of the axle sleeve and to the rear of the vehicle which is aligned with the axis of the bale when the vehicle has been moved a few feet in the spike withdrawal operation.

Further movement of the vehicle causes one line to pull a rear end of the bale to rotate the bale 90° to an unrolling position where the axis of the bale is 90° to the axis of the truck. Further movement of the truck causes the bale to unroll the mat of spirally wound hay in a spiral unrolling fashion to present a long ribbon-like web of hay. When so spread out, the livestock can feed without crowding one another or trampling the field in a concentrated area.

The axle sleeve bale unrolling device is rugged, yet simple in construction and use and can be employed in the field by users without complication and at modest expense.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

FIG. 1 is a top plan view of the axle sleeve of this invention.

FIG. 3 is a view on a reduced scale similar to FIG. 2, but showing the relationship after the spike is removed.

FIG. 5 is a top plan view showing the attachment of the tow lines to the axle sleeve.

FIG. 6 is a view similar to FIG. 5 showing the relationship with the hay bale being unrolled.

FIG. 7 is a view in section taken on the line 7—7 of FIG. 1.

DESCRIPTION OF THE INVENTION

Figure 2:
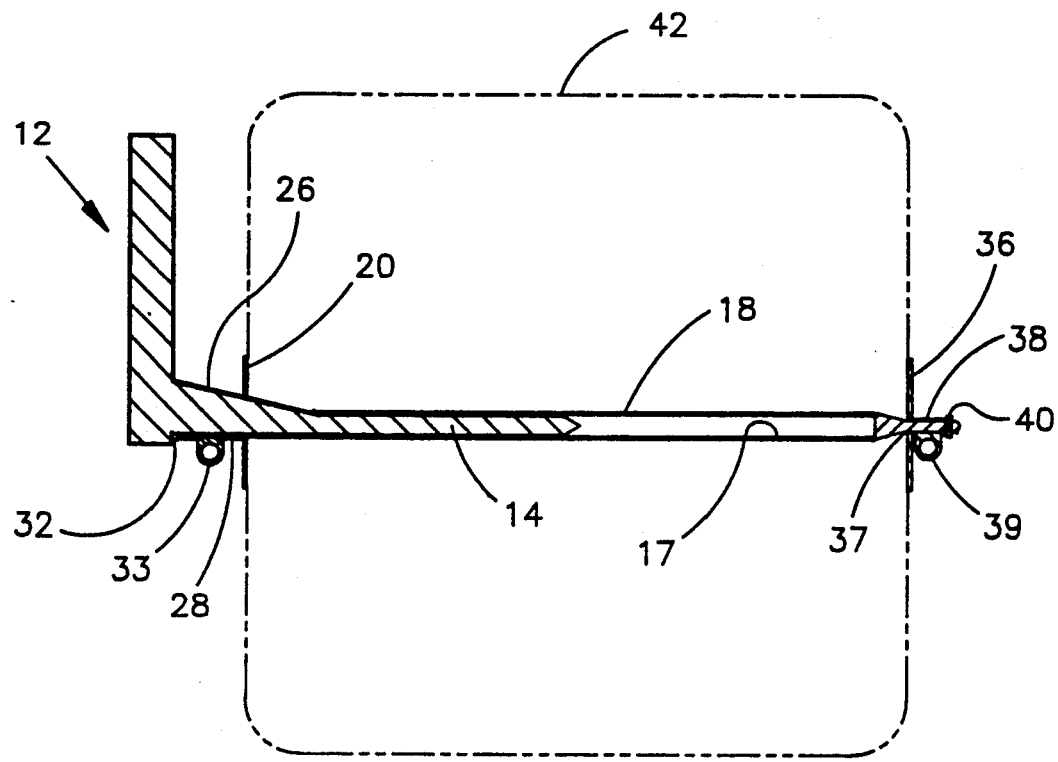
FIG. 2 is a view in left side elevation partly in vertical section showing the axle sleeve fitted over the hydraulic spike impaling a hay bale.

The hay bale unroller of this invention is generally depicted by the reference numeral 10 in FIGS. 1–6. It is employed with a conventional hydraulic or electric lift apparatus 12 having a bale spike 14 which, per se, forms no part of this invention. The bale lifting apparatus is mounted in standard fashion on a farm vehicle such as the truck 16, although it will be understood that tractors may also be employed.

The hay bale unroller 10 is comprised of an elongated tubular axle sleeve 18 having an internal diameter providing an opening 17 sized to fit loosely over the bale spike 14 in order that it may slide on and off the bale spike in the bale impaling operation as will be further described.

The axle sleeve is provided with a disc-like stop plate 20 which is welded to the sleeve at a forward end of the axle sleeve. As shown in FIGS. 1, 2 and 7, the plate 20 and the axle sleeve 18 have slots 22 and 24, respectively, to receive a reinforcing web 26 that adds strength to the bale spike.

Figure 4:
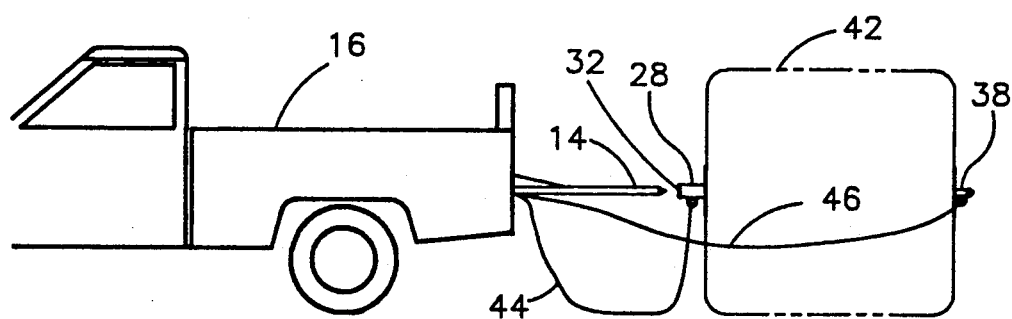
FIG. 4 is a left side elevated view in reduced scale showing the attachment of the tow lines to the axle sleeve.

A hub-like bearing 28 is slidably mounted on the axle sleeve and is free to rotate with respect to the stop plate 20 and the axle sleeve. It also has a slot 30 to receive the bale spike web 26 and is retained on the axle sleeve by a conventional retaining ring 32 as best shown in FIG. 1 and FIG. 2. The ring 32 is secured on the axle sleeve by conventional means such as welding or as a retaining ring fitting in a circumferential groove (not shown)

forming no part of this invention, per se. The bearing 28 is further provided with an eyelet 33 to receive a tow line as shown in FIGS. 4–6.

The axle sleeve 18 as best shown in FIG. 1 and FIG. 2 has tapered rear end 34 merging with a uniform diameter stub shaft 35 which removably receives rear stop plate 36 through an internal opening 37 in the stop plate. The stop plate 36 is free to rotate on the end of the axle sleeve in the manner of a bearing. The tapered end portion 34, as shown in FIGS. 2 and 3, has a larger diameter than the internal diameter of the stop plate opening and serves as a stop to keep the stop plate from bearing too tightly against the impaled bale. The end has a lesser diameter to receive the stop plate through its opening. The tapered portion 34 is positioned from the stop plate 20 a sufficient distance to permit the impaled bale to fit between the stop plate 20 and stop plate 36 and permit relative rotation between the axle sleeve and the latter stop plate. This distance may be slightly greater than the width of the bale. A hub-like collar 38 is welded to the stop plate, and has an eyelet 39 adapted to receive a second tow line. A lynch pin 40 receivable in a hole in the end of the axle sleeve serves to retain the stop plate on the rear end of the axle sleeve.

USE

The hay bale unroller of this invention is simply employed with various types of hydraulic or electric hay bale movers employing a bale impaling spike 14, such as shown in FIG. 3. The axle sleeve 18 is fitted over the bale spike in telescopic fashion in the relationship shown in FIG. 2 before the bale impaling operation. The farm vehicle, such as the truck 16 is then backed toward the bale 42 to thrust the spike encased by the axle sleeve into the center of the bale. The stop plate 36 is then placed on the end of the axle sleeve and is retained by lynch pin 40 as shown in FIG. 2.

The bale may be moved in conventional fashion by operating the lift apparatus 12 to elevate the bale spike and bale 42 with the truck being driven to any desired feeding area. The bale spike is then simply withdrawn by lowering to place the bale upon the ground and driving the truck forward a couple of feet or so to withdraw the spike to the position shown in FIG. 3. The stop plate 36 acts to prevent any friction between the axle sleeve and spike acting to withdraw the axle sleeve with the bale spike such as might be occasioned by unloading on uneven ground. Where desired, the stop plate may be positioned on the axle sleeve after the spike is withdrawn.

After the bale spike has been withdrawn, two tow lines 44 and 46 of substantially even length are connected between the rear of the truck and the ends of the axle sleeve. These lines may be heavy ropes, chains or cables as may be desired. Line 44 is connected between right hand anchor 48 at the rear of the truck and eyelet 33 o bearing 28 while line 46 is connected between anchor 50 and eyelet 39 as best shown in FIGS. 2 and 4.

After the two tow lines have been connected between the rear of the truck and the ends of the axle sleeve as shown in FIGS. 4 and 5, the truck is moved forward and line 46 will pull the rear end of the bale to cause the bale 42 to turn 90° to take up the slack in line 44 and present the bale to the mat unrolling mode shown in FIG. 6. A mat 52 is unwound as the truck is moved to present a wide ribbon of hay for livestock feeding along the length of the ribbon path which may be an extensive distance. In the unrolling operation, the axle sleeve turns with the bale since it is frictionally embedded therein. The bearing 28 and eyelet 33 and the stop plate 36 and collar 38 and eyelet 39 act as bearings and remain steady to permit relative rotation of the bale and axle sleeve.

When the bale 42 has been completely played out, the axle sleeve may be inserted after removal of the tow lines and stop plate 36 and used with a fresh bale.

Various changes and modifications may be made within this invention as will be apparent to those skilled in the art. Such changes and modifications are within the scope and teaching of this invention as defined in the claims appended hereto.

What is claimed is:

1. In a hay bale handling apparatus for handling round bales of hay wound in a spiral mat comprising a hay bale impaling spike mounted on a prime mover vehicle such as a truck in which said spike is employed to impale said hay bale in its axis, lift it and move it as desired and then be withdrawn, the improvement comprising a hay bale unrolling device for unrolling the hay bales, said bale unrolling device comprising an axle sleeve with opposite ends and sized to slidably fit over said spike and being insertable with said spike into said bale, said sleeve being retained in said bale when the spike is removed, a pair of tow lines, tow line receiving means at opposite ends of said sleeve extending beyond said bale and receiving said pair of tow lines connecting said sleeve to said vehicle, said tow lines serving to rotate said bale to permit it to be unrolled when said vehicle is moved away from said bale, said tow line receiving means being connected to said opposite ends of said sleeve by rotation permitting connecting means permitting relative rotation between said sleeve and said connecting means, said sleeve having a first stop member connected to one end of said sleeve which is engageable with a forward end of said bale when the spike is impaled in said bale and a removable second stop member rotatably and removably connected to a second end of said sleeve extendable through a rear end of said bale.

2. The bale unrolling device of claim 1 in which said tow lines are of approximately equal length.

3. The bale unrolling device of claim 1 in which one end of said axle is provided with a stop portion spaced from said first stop member a distance slightly greater than the width of the bale when the axle sleeve is impaled in said bale, said removable stop member being receivable on said one end of said axle sleeve exteriorly of said stop portion.

4. The bale unrolling device of claim 3 in which said removable stop member is freely rotatable on said sleeve.

5. The bale unrolling device of claim 3 in which said stop portion comprises a tapering section of said axle sleeve connecting a major uniform diameter section of said axle sleeve with a reduced diameter end portion of the axle sleeve receiving said removable stop member.

6. The bale unrolling device of claim 1 in which said first stop member serves to bear against an end of said bale when the bale and axle sleeve are impaled therein.

7. The bale unrolling device of claim 6 in which a bearing if fitted on said axle sleeve exteriorly of said first stop member and is connected to one of said tow lines.

8. The bale unrolling device of claim 1 in which a bearing is fitted on said axle sleeve exteriorly of said first stop member and is connected to one of said tow lines and said removable stop member is rotatable with respect to said axle sleeve and is connected to a second one of said tow lines.

9. A method for handling round bales of material wound in a spiral mat with a center area by using a vehicle having a vertically movable bale impaling spike thereon in combination with a bale unrolling device comprising a tubular sleeve having opposite ends and an internal diameter sized to fit loosely over said spike, comprising the steps of:
 1). Mounting the bale unrolling device over the bale impaling spike in a telescopic relationship;
 2). Aligning the bale impaling spike and bale unrolling device thereover with the center area of the bale of material;
 3). Inserting the bale impaling spike and bale unrolling device simultaneously into the center area of the bale of material by moving the vehicle in a first direction toward said bale of material;
 4). Securing the bale of material to the bale unrolling device so that the ends of the tubular sleeve are located externally of the bale of material;
 5). Lifting and transporting said bale of material to a desired area;
 6). Depositing the bale of material on the ground at said desired area;
 7). Removing the bale impaling spike from the unrolling device by moving the vehicle a sufficient distance in a second direction, opposite to said first direction and away from the bale of material;
 8). Connecting a tow line between the vehicle and each respective end of the unrolling device;
 9). Unrolling the bale of material on the ground by moving the vehicle and two lines in said second direction.

10. The method of claim 9 in which said tow lines are connected to exposed opposite ends of said sleeve by rotation permitting connecting means providing relative rotation between said sleeve and said connecting means.

11. The method of claim 9 in which a first stop member is connected to a forward end of said sleeve which is engageable with a forward end of said bale when the spike is impaled in said bale and a removable stop member is provided which is removably connected to an exposed rear end of said sleeve extendable through a rear end of said bale.

12. The method of claim 9 comprising the step of turning the bale of material by moving the vehicle in said second direction until said bale of material is substantially perpendicular to said vehicle.

* * * * *